June 5, 1951  R. S. HAMBY  2,555,691
VENTILATING CONSTRUCTION FOR EXPLOSION-PROOF ELECTRIC MOTORS
Filed July 14, 1949

INVENTOR.
Russell S. Hamby
BY
Knodling and Krost
attys

Patented June 5, 1951

2,555,691

UNITED STATES PATENT OFFICE 2,555,691

VENTILATING CONSTRUCTION FOR EXPLOSIONPROOF ELECTRIC MOTORS

Russell S. Hamby, Cleveland, Ohio, assignor to The Reliance Electric & Engineering Co., a corporation of Ohio Application July 14, 1949, Serial No. 104,716

8 Claims. (Cl. 172—36)

This invention relates in general to ventilating constructions, and more particularly to ventilating constructions for an opening in the frame of an explosion-proof electric motor.

While the pressures from internal explosions in explosion-proof motors are not generally high enough to be dangerous due to the relatively small internal free volume, it is nevertheless possible under certain conditions to obtain dangerously high pressures. An example of this is the so-called pressure "piling" action which occurs when an explosion initiated at one end of the motor is propagated through a small opening, such as a lead channel to the other end. Under these critical conditions, pressures obtained are all out of proportion to the internal volume of the motor involved. Ventilating constructions of the type herein described when applied to such motors fulfill an important function in relieving these high pressures.

Tests and experiments have shown that even a very small amount of circulating air is of considerable assistance in increasing the rating of an electric motor. The amount of air which may be circulated through the motor by the use of fans is limited by the possibility of after-burning following the explosion. With experiments made to date it appears that a quantity of air amounting to three or four air changes per minute may be passed through the motor without being troubled by after-burning. This amount of air circulation eliminates the condensation problem, and it gives a material increase in rating by greatly improving the heat transfer from the motor windings not only to the air itself but also to the frame of the motor.

An object of the invention is to provide for relieving explosion pressures caused by the ignition of the explosive gas-air mixture to be found in many mines by a commutator spark or some other electrical means.

Another object of the invention is the provision of a ventilating construction which permits circulation of outside air through the interior of the motor, thereby not only making it possible to increase the rating of the motor, but also making it possible to eliminate condensation which has always been a problem in motors designed for mine service, inasmuch as the accumulation of water inside the motor, over a period of time, is a principal cause of coil failure.

Other objects and a fuller understanding of the invention may be had by referring to the following description and claims, taken in conjunction with the accompanying drawings, in which:

Figure 3:
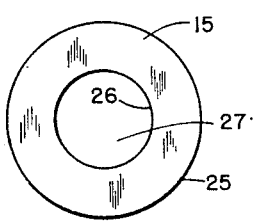
Figure 3 is a top plan view of a first type plate employed in the ventilating construction.
Figure 4:
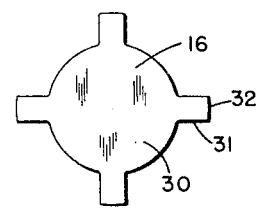
Figure 4 is a plan view of a second type plate used in the ventilating construction.
Figure 5:
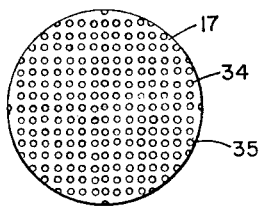
Figure 5 is a plan view of a third type plate employed in the ventilating construction.

With reference to the drawings, the reference character 10 indicates generally an end of an explosion-proof motor having a plurality of openings 11. In each of the openings there is mounted a ventilating construction indicated generally by the reference character 12. The ventilating construction comprises a stack of a plurality of plates of which there are three types. The first type is indicated by the reference character 15 (Figure 3), the second type by the reference character 16 (Figure 4), and the third type by the reference character 17 (Figure 5). The first type plate 15 comprises an annular member having an outer edge 25 for fitting into the motor frame opening 11 and having an inner edge 26 defining an aperture 27 which is substantially centrally disposed of the plate. The second type plate 16 comprises a continuous plate having a central area 30 greater than the area of the aperture 27 in the first type plate 15. As illustrated in Figure 4, the second type plate is provided with outwardly extending arms 31 having end edges 32 fitting in the motor frame opening. The third type plate 17 comprises a perforated plate having a large number of small openings 34 and having an outer edge 35 fitting in the motor frame opening 11. The third type of plate 17 is preferably constructed of brass, of which the perforations make up approximately 30 per cent of the area of the plate. The first and second types of plates 15 and 16 are preferably constructed of sheet steel with the ventilating area being approximately 30 per cent of the entire area of the plate.

Figure 1:
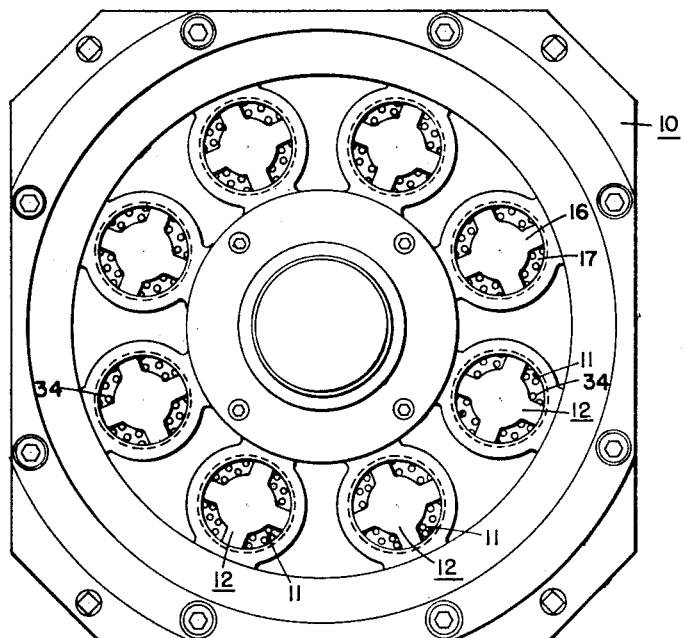
Figure 1 is an end view of an explosion-proof motor embodying a plurality of the ventilating structures.
Figure 2:
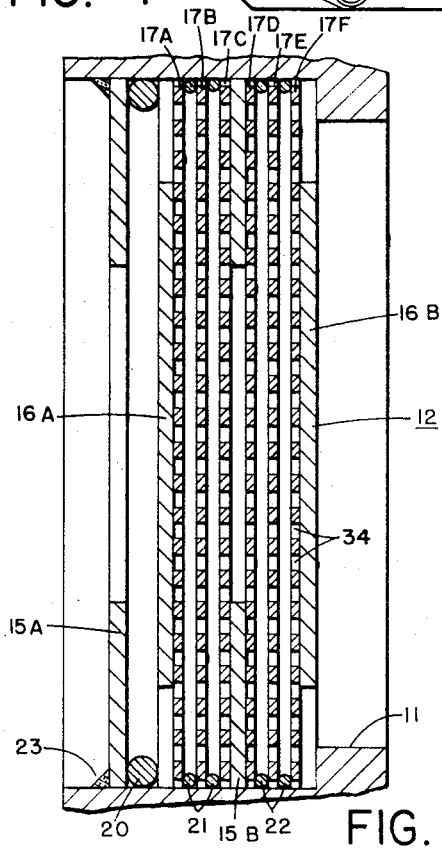
Figure 2 is an enlarged cross-sectional view taken along the line 2—2 of Figure 1, and showing a cross-section of the ventilating structure.

The order in which the plates are stacked in the opening 11 is shown in Figure 2. The initial plate of said stack beginning on the inside of the motor is the first type plate designated by the reference character 15A. The portion of the stack or group of plates immediately following the initial plate comprises a second type plate designated by the reference character 16A, a first series of third plates, three in number, designated respectively by the reference characters 17A, B and C, and another first type plate represented by the reference character 15B, which concludes the group. The remaining plates comprise a second series of third type plates, being three in number and being designated respectively by the reference characters 17D, E and F, concluded by another second type plate represented by the reference character 16B which is the final plate of the stack on the outside of the motor frame. The first plate 15A of the stack may have its peripheral edge welded at 23 to the inside edge of the opening 11 to hold the entire stack in the opening of the motor frame. A first spacer 20 is mounted between the initial first plate 15A and the second plate 16A to hold the plates in the spaced relationship with each other in the motor frame opening 11. Second spacers indicated by the reference character 21 are employed between the plates of the first series of the third type to hold the plates 17A, B and C of the first series in spaced relationship with each other in the motor frame opening 11. Third spacers 22 are employed between the second series of third plates 17D, E and F to hold the said plates in spaced relationship with each other in the motor frame opening.

Summarizing, the plates beginning on the side of the motor frame are stacked as follows: A first type plate 15A, a second type plate 16A, a first series comprising at least three of said third type plates 17A, B and C, another first type plate 15B, a second series comprising at least three of said third type plates 17D, E and F, and another second type plate 16B concluding the end of the stack on the outside of the motor frame.

The first spacer 20 may be substantially .125 of an inch, and the second and third spacers 21 and 22 may be in the order of .045 of an inch.

Upon explosion, the flame front, upon reaching the ventilating device, first passes through the central opening 27 of the first type plate 15A. Then the flame front is deflected by the second type plate 16A, whereupon the flame front spreads out in the narrow opening between the first and second type plates 15A and 16A. The rapid change in area causes a corresponding loss of pressure. In addition, considerable heat is absorbed by the first and second types spaced plates 15A and 16A, whereupon the heat is conducted to the motor casing. The flame then passes through the small openings 34 in the first series of three plates of the third type 17A, B and C, which, due to the perforations or small openings present a large surface area enabling a large amount of heat to be conducted to the motor casing. The flame is then channeled through the central aperture 27 of the first type plate 15B, this channeling resulting in another pressure drop, whereupon the flame is conducted through the second series of three plates of the third type 17D, E and F where more heat is still removed and conducted to the motor frame. The flame finally flows through the ventilating openings provided by the second type plate 16B which is the final plate of the stack. Experience and tests show that the combinations of pressure losses and cooling effects extinguish a flame before the exterior of the casing is reached.

It is to be observed that the plate 17A rests directly against the right-hand side of the second type plate 16A without any spacer therebetween, and that the plate 17C rests directly against the left-hand side of the second type plate 15B without any spacer therebetween. Further, it is to be observed that the plates 17D rest directly against the right-hand side of the first type plate 15B, and that the plates 17F rest directly against the left-hand side of the second type plate 16B. Experience shows that with this type of stacking the flame is extinguished before the exterior of the casing of the motor is reached.

A ventilating structure embodying the features of this invention not only relieves explosion pressures, but also enables circulating air by the use of a fan to be forced through the inside of the motor frame to increase the motor rating, as well as to eliminate the condensation problem of water collecting within the frame and damaging the motor windings and other parts.

The term "electric motor," as employed herein, is used in a generic sense and includes any type of a dynamoelectric machine, including generators as well as motors.

Although the invention has been described in its preferred form with a certain degree of particularity it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A ventilating construction for an opening in the frame of an explosion-proof electric motor, said ventilating construction comprising a stack of plates for said motor frame opening, said plates comprising at least first, second and third types, said first type comprising an annular member having an outer edge fitting in said motor frame opening and having an inner edge defining a substantially centrally disposed aperture, said second type comprising a continuous plate having a central area greater than the aperture in said first type plate and being provided with outwardly extending arms having end edges fitting in said motor frame opening, said third type comprising a perforated plate having a large number of small openings and having an outer edge fitting in said motor frame opening, said plates beginning on the inside of the motor frame being stacked as follows: a first plate, a second plate, first spacer means between said first and second plates to hold said plates in spaced relationship with each other in said motor frame opening, a first series comprising at least three of said third plates, second spacer means between said third plates of said first series to hold said third plates in spaced relationship with each other in said motor frame opening, another first plate, a second series comprising at least three of said third plates, third spacer means between said third plates of said second series to hold said third plates in spaced relationship with each other in said motor frame opening, and finally another second plate concluding the end of the stack on the outside of the motor frame, and means for holding said plates in said motor frame opening.

2. A ventilating construction for an opening in the frame of an explosion-proof electric motor, said ventilating construction comprising a stack of plates for said motor frame opening, said plates comprising at least first, second and third types, said first type comprising an annular member having an outer edge fitting in said motor frame opening and having an inner edge defining a substantially centrally disposed aperture, said second type comprising a continuous plate having a central area greater than the aperture in said first type plate and being provided with outwardly extending arms having end edges fitting in said motor frame opening, said third type comprising a perforated plate having a large number of small openings and having an outer edge fitting in said motor frame opening, said plates beginning on the inside of the motor frame being stacked as follows: a first plate, a second plate, first spacer means between said first and second plates to hold said plates in spaced relationship with each other in said motor frame opening, a first series comprising at least three of said third plates, second spacer means between said third plates of said first series to hold said third plates in spaced relationship with each other in said motor frame opening, another first plate, the initial plate of said first series resting against the second plate and the final plate of said first series resting against the said another first plate, a second series comprising at least three of said third plates, third spacer means between said third plates of said second series to hold said third plates in spaced relationship with each other in said motor frame opening, and finally another second plate concluding the end of the stack on the outside of the motor frame, the initial plate of said second series resting against the said another first plate and the final plate of said second series resting against the said another second plate, and means for holding said plates in said motor frame opening.

3. A ventilating construction for an opening in the frame of an explosion-proof electric motor, said ventilating construction comprising a stack of plates for said motor frame opening, said plates comprising at least first, second and third types, said first type comprising an annular member having an outer edge fitting in said motor frame opening and having an inner edge defining a substantially centrally disposed aperture, said second type comprising a continuous plate having a central area greater than the aperture in said first type plate and being provided with outwardly extending arms having end edges fitting in said motor frame opening, said third type comprising a perforated plate having a large number of small openings and having an outer edge fitting in said motor frame opening, said plates beginning on the inside of the motor frame being stacked as follows: a first plate, a second plate, first spacer means between said first and second plates to hold said plates in spaced relationship with each other in said motor frame opening, a first series comprising a plurality of said third plates, second spacer means between said third plates of said first series to hold said third plates in spaced relationship with each other in said motor frame opening, another first plate, a second series comprising a plurality of said third plates, third spacer means between said third plates of said second series to hold said third plates in spaced relationship with each other in said motor frame opening, and finally another second plate concluding the end of the stack on the outside of the motor frame, and means for holding said plates in said motor frame opening.

4. A ventilating construction for an opening in the frame of an explosion-proof electric motor, said ventilating construction comprising a stack of spaced plates for said motor frame opening, said plates comprising at least first, second and third types, said first type comprising an annular member having an outer edge fitting in said motor frame opening and having an inner edge defining a substantially centrally disposed aperture, said second type comprising a continuous plate having a central area greater than the aperture in said first type plate and being provided with outwardly extending arms having end edges fitting in said motor frame opening, said third type comprising a perforated plate having a large number of small openings and having an outer edge fitting in said motor frame opening, said first, second and third plates in the order named constituting the arrangement of the plates for the beginning of the stack on the inside of the motor frame and said first, third and second plates in the order named constituting the arrangement of the plates for the ending of the stack on the outside of the motor frame.

5. A ventilating construction for an opening in the frame of an explosion-proof electric motor, said ventilating construction comprising a stack of spaced plates for said motor frame opening, said plates comprising at least first, second and third types, said first type comprising an annular member having an outer edge fitting in said motor frame opening and having an inner edge defining a substantially centrally disposed aperture, said second type comprising a continuous plate having a central area greater than the aperture in said first type plate and being provided with outwardly extending arms having end edges fitting in said motor frame opening, said third type comprising a perforated plate having a large number of small openings and having an outer edge fitting in said motor frame opening, the initial plate of said stack beginning on the inside of the motor being said first plate, and the portion of the stack immediately following the initial plate comprising a second plate, a series of said third plates concluded by another first plate.

6. A ventilating construction for an opening in the frame of an explosion-proof electric motor, said ventilating construction comprising a stack of plates for said motor frame opening, said plates comprising at least first, second and third types, said first type comprising an annular member having an outer edge fitting in said motor frame opening and having an inner edge defining a substantially centrally disposed aperture, said second type comprising a continuous plate having a central area greater than the aperture in said first type plate and being provided with outwardly extending arms having end edges fitting in said motor frame opening, said third type comprising a perforated plate having a large number of small openings and having an outer edge fitting in said motor frame opening, said plates beginning on the inside of the motor frame being stacked as follows: a first plate, a second plate, first spacer means between said first and second plates to hold said plates in spaced relationship with each other in said motor frame opening, a first series comprising at least three of said third plates, second spacer means between said third plates of said first series to hold said third plates in spaced relationship with each other in said motor frame opening, another first plate, a second series comprising at least three of said third plates, third spacer means between said third plates of said second series to hold said third plates in spaced relationship with each other in said motor frame opening, and finally another second plate concluding the end of the stack on the outside of the motor frame, and means for holding said plates in said motor frame opening, the ventilating area of said plates being approximately 30 per cent of the entire area of the plates.

7. A ventilating construction for an opening in the frame of an explosion-proof electric motor, said ventilating construction comprising a stack of plates for said motor frame opening, said plates comprising at least first, second and third types, said first type comprising an annular member having an outer edge fitting in said motor frame opening and having an inner edge defining a substantially centrally disposed aperture, said second type comprising a continuous plate having a central area greater than the aperture in said first type plate and being provided with outwardly extending arms having end edges fitting in said motor frame opening, said third type comprising a perforated plate having a large number of small openings and having an outer edge fitting in said motor frame opening, said plates beginning on the inside of the motor frame being stacked as follows: a first plate, a second plate, first spacer means between said first and second plates to hold said plates in spaced relationship with each other in said motor frame opening, a first series comprising at least three of said third plates, second spacer means between said third plates of said first series to hold said third plates in spaced relationship with each other in said motor frame opening, another first plate, the initial plate of said first series resting against the second plate and the final plate of said first series resting against the said another first plate, a second series comprising at least three of said third plates, third spacer means between said third plates of said second series to hold said third plates in spaced relationship with each other in said motor frame opening, and finally another second plate concluding the end of the stack on the outside of the motor frame, the initial plate of said second series resting against the said another first plate and the final plate of said second series resting against the said another second plate, and means for holding said plates in said motor frame opening, the ventilating area of said plates being approximately 30 per cent of the entire area of the plate.

8. A ventilating construction for an opening in the frame of an explosion-proof electric motor, said ventilating construction comprising a stack of plates for said motor frame opening, said plates comprising at least first, second and third types, said first type comprising an annular member having an outer edge fitting in said motor frame opening and having an inner edge defining a substantially centrally disposed aperture, said second type comprising a continuous plate having a central area greater than the aperture in said first type plate and being provided with outwardly extending arms having end edges fitting in said motor frame opening, said third type comprising a perforated plate having a large number of small openings and having an outer edge fitting in said motor frame opening, said plates beginning on the inside of the motor frame being stacked as follows: a first plate, a second plate, first spacer means between said first and second plates to hold said plates in spaced relationship with each other in said motor frame opening, a first series comprising a plurality of said third plates, second spacer means between said third plates of said first series to hold said third plates in spaced relationship with each other in said motor frame opening, another first plate, a second series comprising a plurality of said third plates, third spacer means between said third plates of said second series to hold said third plates in spaced relationship with each other in said motor frame opening, and finally another second plate concluding the end of the stack on the outside of the motor frame, and means for holding said plates in said motor frame opening, the ventilating area of said plates being approximateley 30 per cent of the entire area of the plates, at least one third type plate disposed in contact with one of said first and second type plates in said stack to thereby reduce the total ventilating area of the combined contacting plates to approximately nine per cent of the entire area of the plates.

RUSSELL S. HAMBY.

REFERENCES CITED

The following references are of record in the file of this patent:

UNITED STATES PATENTS

| Number | Name | Date |
|---|---|---|
| 1,720,364 | Holmes | July 9, 1929 |
| 1,960,259 | Wyman | May 29, 1934 |
| 2,452,248 | Lee | Oct. 26, 1948 |